United States Patent
Gretz

(10) Patent No.: US 11,088,523 B1
(45) Date of Patent: Aug. 10, 2021

(54) POKE-THROUGH FLOOR BOX ASSEMBLY

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 8 days.

(21) Appl. No.: 16/782,630

(22) Filed: Feb. 5, 2020

Related U.S. Application Data

(60) Provisional application No. 62/801,306, filed on Feb. 5, 2019.

(51) Int. Cl.
*H02G 3/18* (2006.01)
*H02G 3/08* (2006.01)
*H02G 3/14* (2006.01)

(52) U.S. Cl.
CPC ............. *H02G 3/185* (2013.01); *H02G 3/088* (2013.01); *H02G 3/14* (2013.01)

(58) Field of Classification Search
CPC .......... H02G 3/08; H02G 3/081; H02G 3/083; H02G 3/088; H02G 3/10; H02G 3/12; H02G 3/121; H02G 3/123; H02G 3/185; H05K 5/00; H05K 5/02; H05K 5/03; H05K 5/0247; H05K 5/0213; H01R 27/00; H01R 13/58
USPC ......... 174/480, 481, 483, 54, 482, 484, 490, 174/494, 488, 487, 50, 53, 57; 52/220.3, 52/220.7, 220.1, 220.8; 220/3.2–3.9, 4.02
See application file for complete search history.

(56) References Cited

U.S. PATENT DOCUMENTS

| | | | | |
|---|---|---|---|---|
| 6,750,395 B2 * | 6/2004 | Stout | ...................... | H02G 3/185 174/483 |
| 7,053,296 B2 * | 5/2006 | Drane | ................... | H02G 3/0493 174/483 |
| 7,064,268 B2 * | 6/2006 | Dinh | ....................... | H02G 3/185 174/485 |
| 7,569,776 B2 * | 8/2009 | Jolly | ..................... | H02G 3/0493 174/481 |
| 8,242,365 B2 * | 8/2012 | Galasso | .................. | H02G 3/185 174/67 |
| 8,878,058 B2 * | 11/2014 | Wurms | ..................... | H02G 3/08 174/50 |
| 9,148,007 B2 * | 9/2015 | Drane | ..................... | H02G 3/185 |
| 10,530,140 B2 * | 1/2020 | Drane | .................... | H02G 3/081 |
| 10,770,875 B2 * | 9/2020 | Byrne | .................... | H02G 3/185 |

* cited by examiner

*Primary Examiner* — Angel R Estrada

(57) ABSTRACT

A poke-through floor box assembly adapted to be supported in an opening in the floor of a building. An intumescent layer in the assembly provides a fire-proof rating for the floor box to match the fire-proof rating of the surrounding structure. The assembly includes a can and an electrical box having separate compartments for housing low and high voltage components. A transition body extends between the electrical box and the can opening. A flange and cover provide a means for closing the assembly. Keystone holders on the transition body enable mounting of low voltage devices such as USB ports. EMT fittings provide a means for attaching electrical metal tubing to the can to carry power and low voltage signals into the can. Alignment features on both the electrical box and the transition body enable rapid assembly and installation of the electrical box at the job site.

7 Claims, 7 Drawing Sheets

POKE-THROUGH FLOOR BOX ASSEMBLY

CROSS-REFERENCE TO RELATED APPLICATIONS

This application claims priority to provisional U.S. Application No. 62/801,306, filed Feb. 5, 2019.

FIELD OF THE INVENTION

This invention relates to devices for installing electrical service to a floor and more specifically to an electrical box assembly for installing one or more electrical components to a floor.

BACKGROUND OF THE INVENTION

Poke-through floor boxes are configured to be supported in the floor of a building structure and typically are adapted to accept both power and low voltage components. The floor boxes are adapted to fit in an opening in a floor and should include a fire rating equal to the fire rating of the surrounding floor.

Although various poke-through floor boxes have been proposed, they typically are of complex design and consume a substantial amount of time to install in the building structure.

BRIEF SUMMARY OF THE INVENTION

The invention is a poke-through floor box assembly that is adapted to be supported in an opening in the floor of a building. An intumescent layer in the can provides a fire-proof rating for the floor box to match the fire-proof rating of the surrounding structure. An electrical box nests within the can and divides the can into separate compartments for housing low and high voltage components. The floor box assembly includes a transition body extending between the electrical box and the can opening and a flange and cover for closing the assembly. Keystone holders on the transition body enable mounting of low voltage devices such as USB ports. EMT fittings or rigid tubing provide a means for attaching electrical metal tubing to the can to carry power and low voltage signals into the can. Alignment features on both the electrical box and the transition body enable rapid assembly and installation of the electrical box at the job site.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
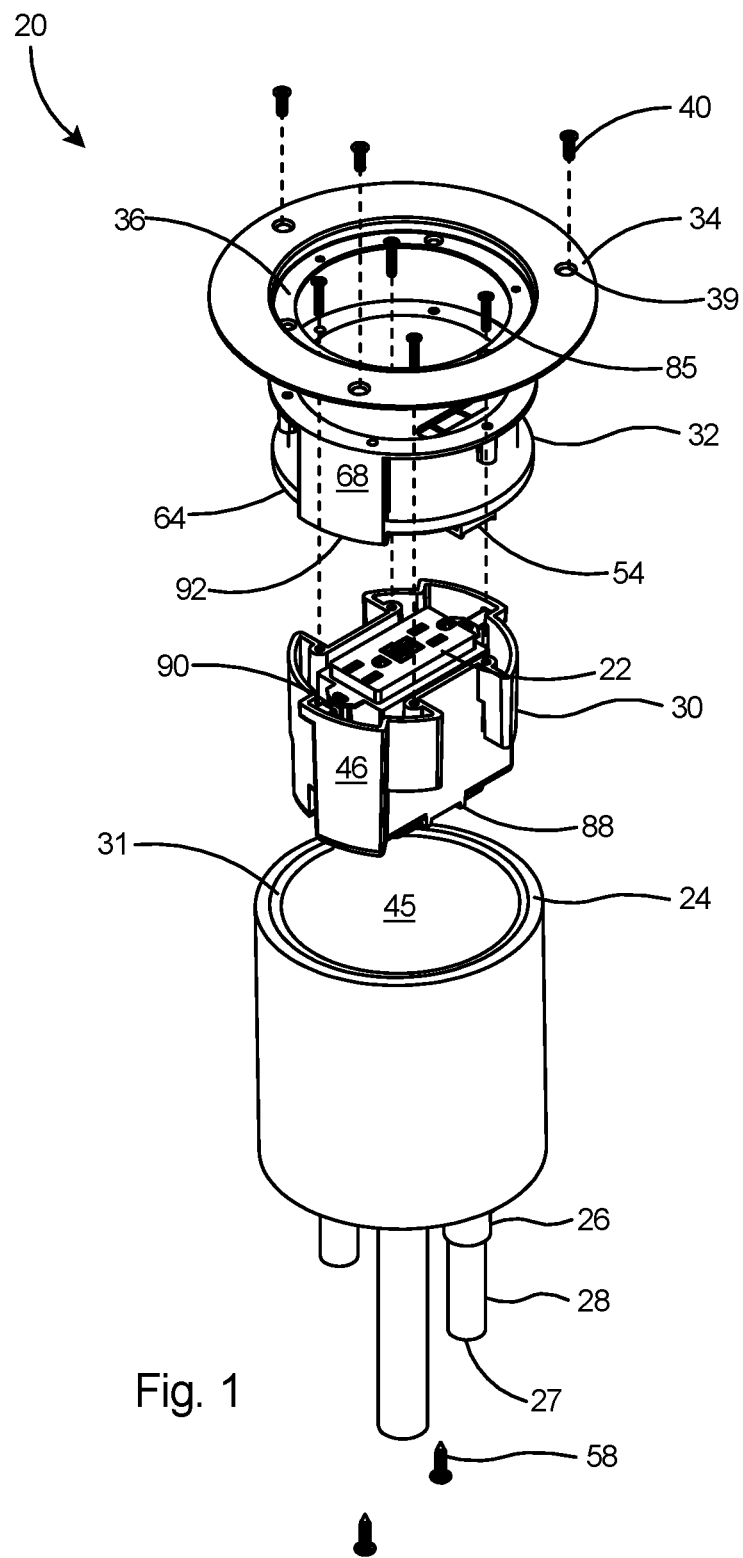
FIG. 1 is an exploded perspective view of a poke-through floor box assembly according to the invention.

With reference to FIG. 1, the present invention is a poke-through floor box assembly 20 for mounting an electrical receptacle 22 in a floor. The poke-through floor box assembly 20 includes a can 24 with one or more electrical metal tubing (EMT) fittings 26 including bores 27 therein to which ends of EMT 28 can be connected thereto for leading electrical wiring into the can 24. An electrical box 30 nests inside the can 24 and is secured therein. The inner surface of the can includes a layer of intumescent material 31. A transition body 32 extends above the electrical box 30 and a flange 34 is secured to the electrical box 30 to provide a periphery around the top of the transition body 32 in its connection to the floor. The flange 34 includes a recessed inner periphery for accommodating flush mounting of a cover plate (not shown).

Figure 2:
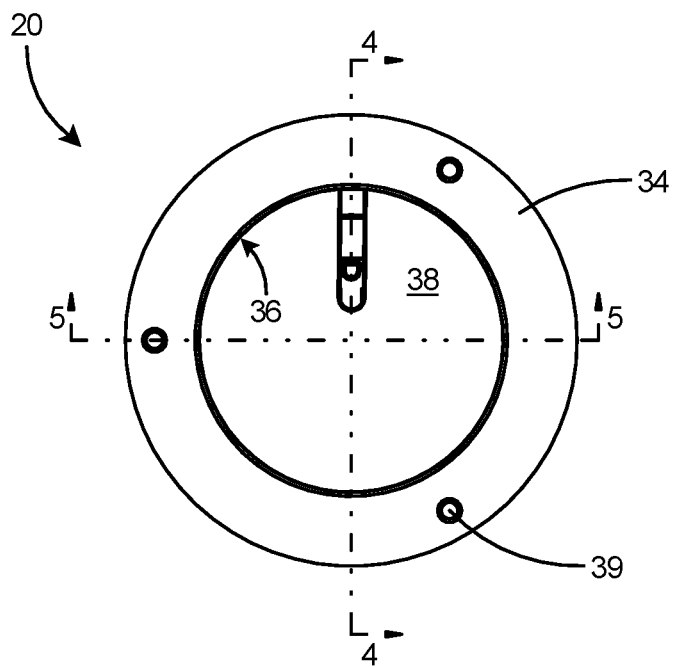
FIG. 2 is a top view of floor box assembly with a slotted cover plate installed on the assembly.
Figure 3:
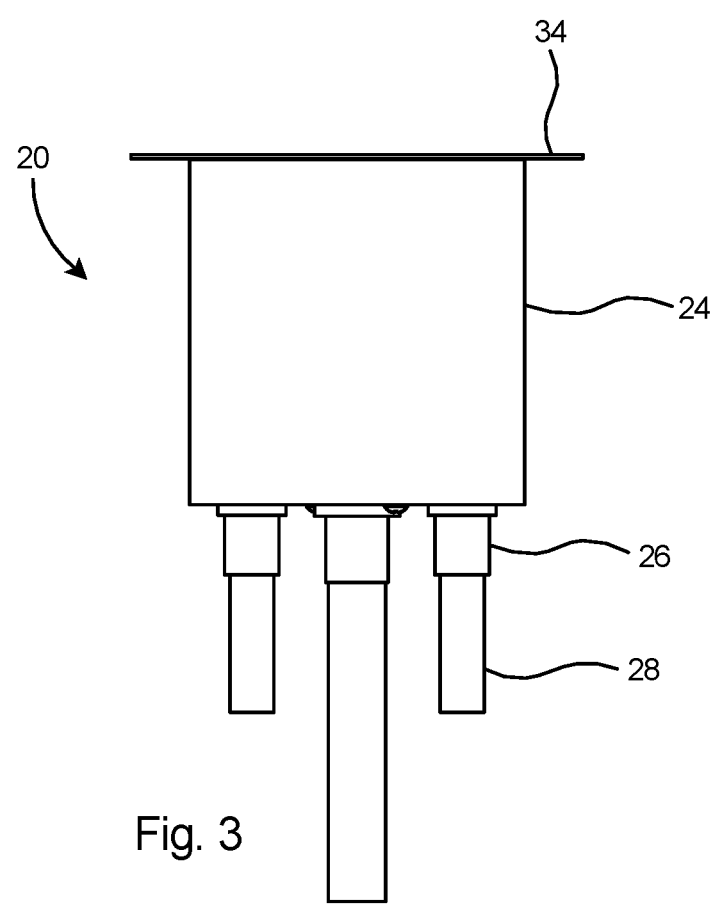
FIG. 3 is a side view of the floor box assembly.

As shown in FIG. 2, a recessed inner periphery 36 at the top of the transition body 32 may be closed by a cover plate 38. The flange 34 preferably includes one or more apertures 39 for accommodating fasteners 40 (see FIG. 1) for securing the flange 34 to a floor. As shown in FIG. 3, the flange 34 is of wider diameter than the can 24.

Figure 4:
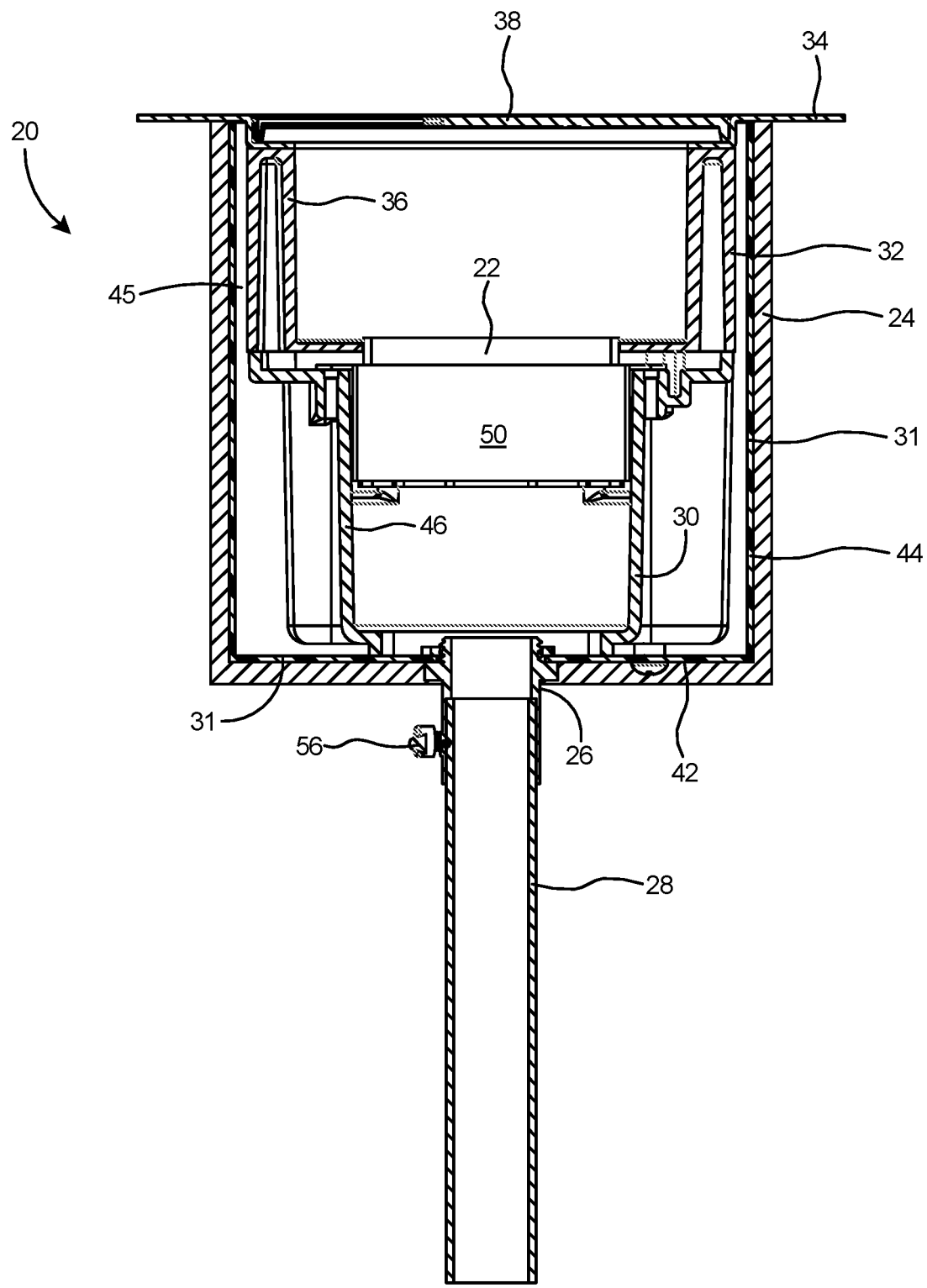
FIG. 4 is a sectional view of the floor box assembly taken along line 4-4 of FIG. 2.

With reference to FIG. 4, the can 24 includes a base wall 42 and a sidewall 44 defining a chamber 45 therein. When inserted into the can 24, the sidewalls 46 of the electrical box 30 divide the lower portion of the can into separate wiring cavities. The sidewalls 46 of the electrical box 30 and base wall 42 of the can 24 define a high voltage cavity 50. The electrical receptacle 22 may be mounted in the high voltage cavity 50. The layer of intumescent material 31 is extends around the inner surface 36 of the can 24.

Figure 5:
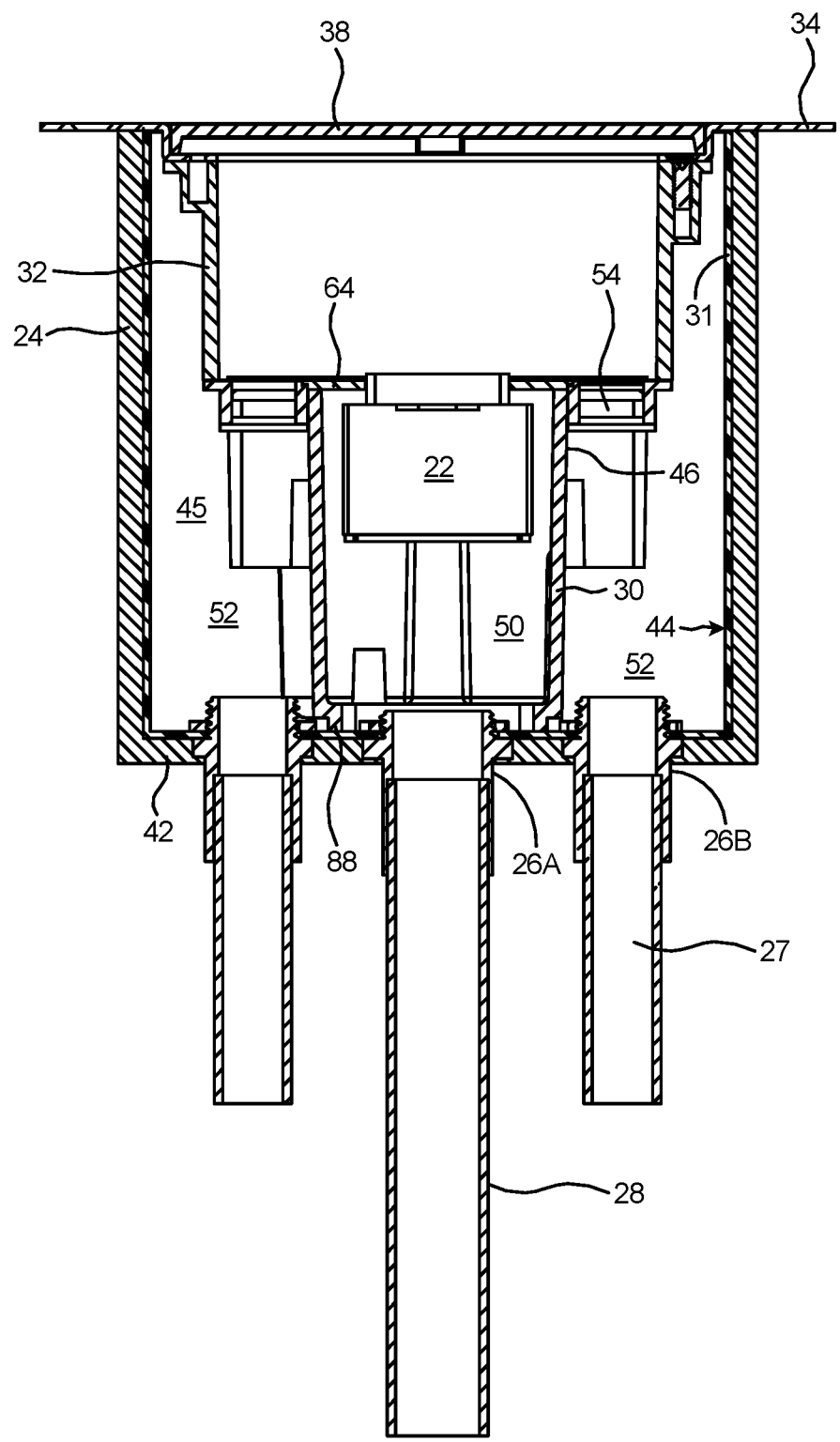
FIG. 5 is a sectional view of the floor box assembly taken along line 5-5 of FIG. 2.

Referring to FIG. 5, one or more low voltage cavities 52 are defined by the sidewalls 46 of the electrical box and the sidewall 44 of the can 24. Keystone holders 54 are provided on the transition body 32 for the mounting of low voltage devices (not shown) such as USB ports. The keystone holders 54 preferably extend from the base plate 64 of the transition body 32. The transition body 32 mounts within the can 24 and provides a recessed area 53 between the floor and the receptacle 22. In the embodiment shown in FIG. 5, there are three EMT fittings 26 including a middle fitting 26A that will align an EMT with the high voltage cavity 50 and two outer EMT fittings 26B that will each align an EMT with the low voltage cavities 52.

Figure 6:
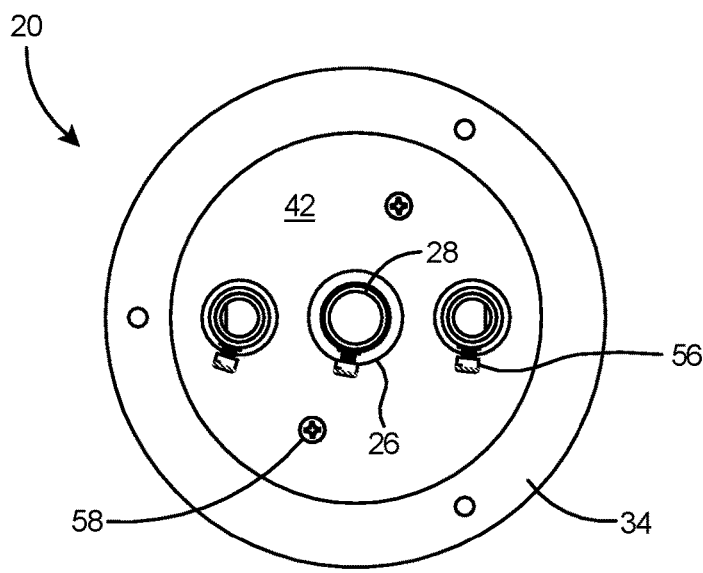
FIG. 6 is a bottom view of the floor box assembly.
Figure 7:
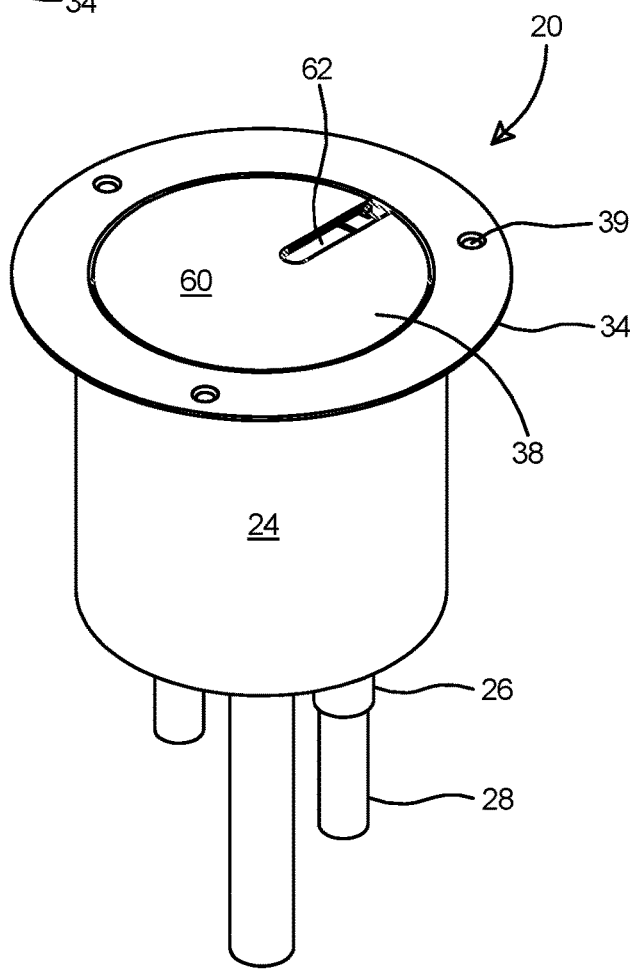
FIG. 7 is an isometric view of floor box assembly with a flange installed on the assembly.

With reference to FIG. 6, the EMT fittings 26, to which ends of EMT 28 may be secured thereto by fasteners 56, extend from the base wall 42 of the can 24. Fasteners 58 extending through the base wall 42 of the can 24 secure the electrical box 30 to the can 24. As shown in FIG. 7, the floor box assembly may further include the cover plate 38 including a plate 60 with a slot 62 therein, the slot enabling passage of an electrical cord (not shown) from the receptacle into the can 24 to enable a user to keep an electrical cord plugged into the receptacle while the cover plate 38 is closed on the floor box.

Figure 8:
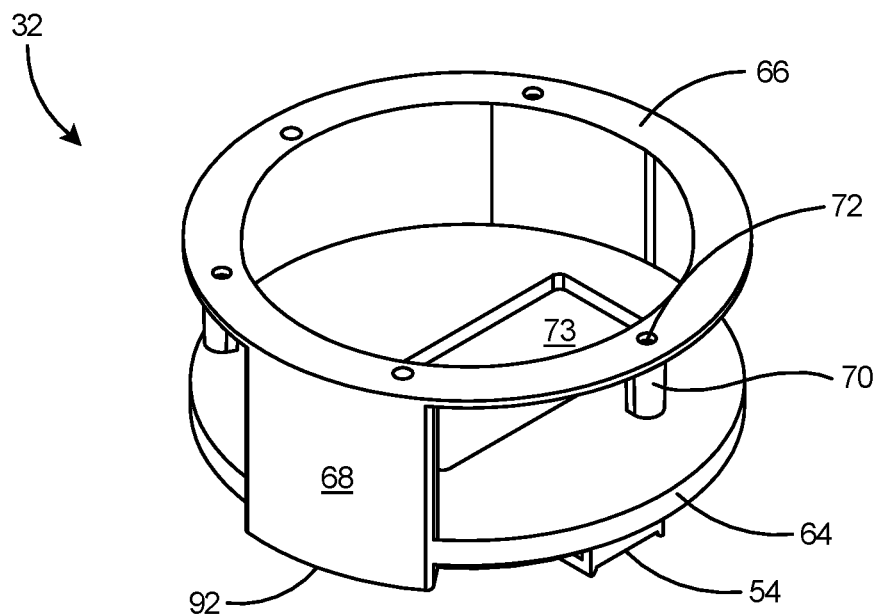
FIG. 8 is an isometric view of the transition body.

Referring to FIG. 8, the transition body 32 includes the base plate 64, a ring 66, and one or more supports 68 extending between the base plate 64 and the ring 66. One or more bosses 70 extend from the ring 66. Apertures 72 in ring 66 axially align with a complementary bore (not shown) in each boss 70 and with fasteners (not shown) provide a means of securing the cover plate 38 to the transition body 32 and poke-through floor box assembly. The base plate 64 includes an opening 73 that, in the assembled floor box, will provide access to the electrical receptacle.

Figure 9:
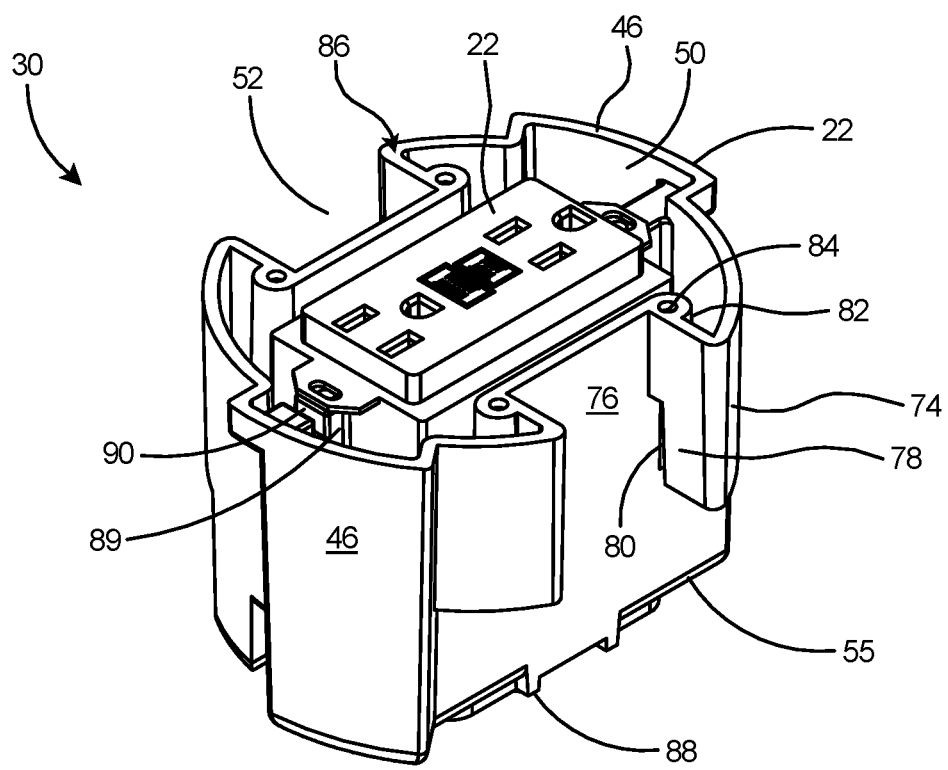
FIG. 9 is an isometric view of the electrical box portion of the floor box assembly.

With reference to FIG. 9, the electrical box 30 is shown with a receptacle 22 secured therein in the high voltage cavity 50. Two wings 74 extend outward from the electrical box sidewalls 46. The wings 74 extend from a flat recessed wall 76 and include facing walls 78. Bosses 82 extending from the facing walls 78 include bores 84 that accept fasteners 85 (see FIG. 1) to provide attachment means for securing the transition body 32 (see FIG. 8) to the electrical box 30. The facing walls 78 each include a slot 80 to accommodate the ends of fasteners that extend through the bosses. Electrical box 30 includes a planar top edge 86, a tab 88 extending down from the recessed wall 76, a post 89 for mounting the receptacle 22, and grooves 90 in the post 89.

With reference to FIGS. 8 and 9, transition body 32 includes one or more legs 92 which align with and extend into grooves 90 of electrical box 30 when the transition body and electrical box are fitted together.

The intumescent layer within the can forms an insulating barrier to retard the spread of flames and heat and protect the interior of the can against temperature increases. As the temperature rises, the intumescent layer forms a refractory char. The poke-through floor box assembly is a steel encased electrical box that includes a layer of intumescent fireproofing material. The electrical box will be mounted from the top of the assembly thru the floor flange using fasteners, such as TAPCON® screws.

Figure 10:
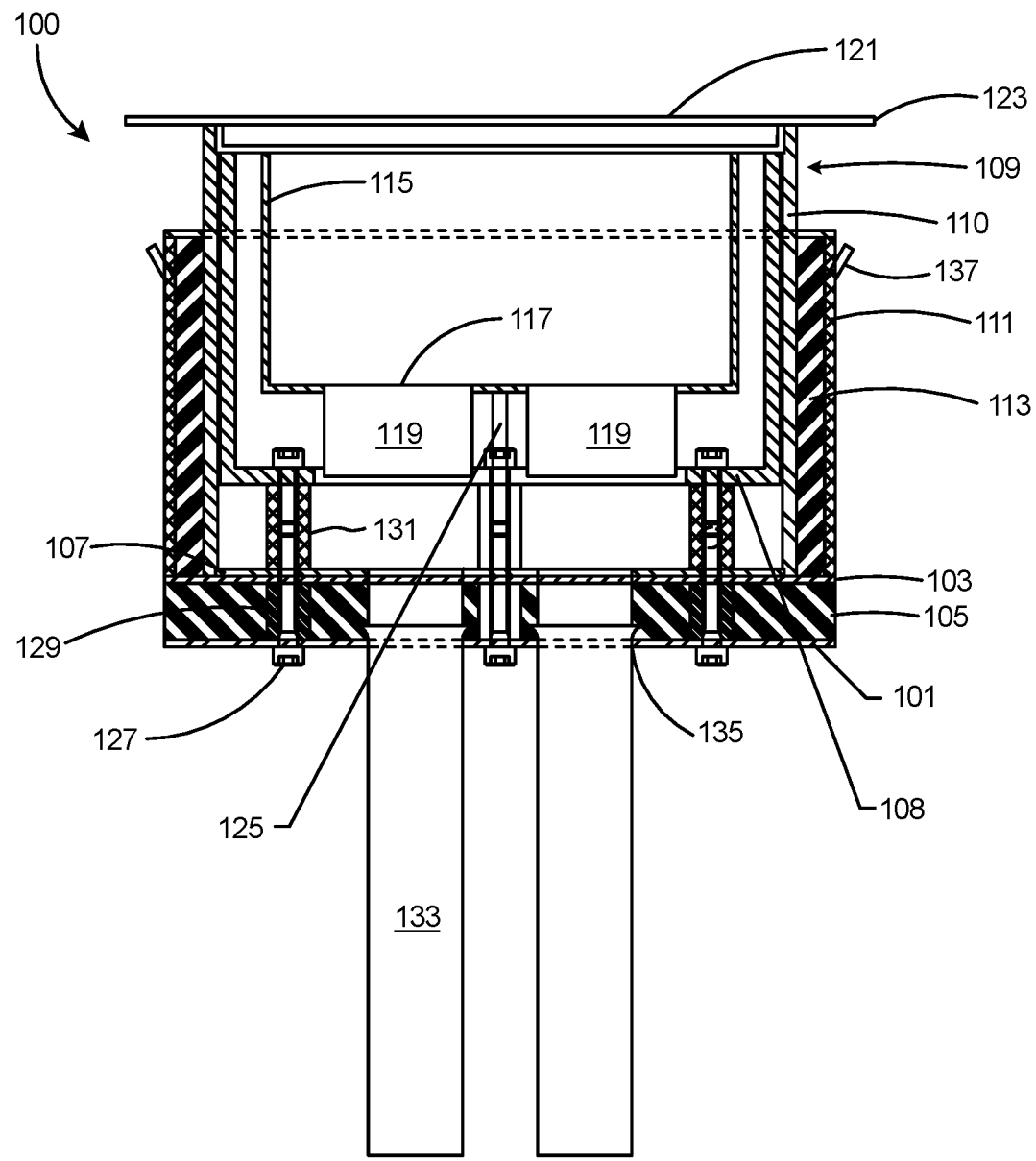
FIG. 10 is a sectional view of a second embodiment of a poke-through floor box assembly.

Referring to FIG. 10, the second embodiment of a poke-through floor box assembly 100 according to the invention includes an outer shield 101, a glass fiber sheet 103, and an intumescent sheet 105 between the outer shield and the glass fiber sheet. A steel bottom plate 107 is flush with the glass fiber sheet 103. A steel sleeve 109, includes a tubular portion 110 that extends from the glass fiber sheet 103 and a lip 108 extends inward from the tubular portion. A perforated tubular sheet 111, of greater diameter than the steel sleeve, extends upward from the glass fiber sheet 103. A tubular intumescent layer 113 is included between the outer periphery of the tubular steel sleeve 109 and the perforated tubular sheet 111. A duplex trim insert 115 is nested within the steel sleeve 109 and includes openings 117 leading into cavities 119 for mounting of an electrical component (not shown), such as a duplex receptacle or a low voltage device such as an HDMI cable connector. A top plate 121 closes the top of the floor box assembly 100 and includes a flange 123 for covering the floor surface surrounding the floor box assembly. An internal voltage shield 125 is provided between the cavities 119 to provide electrical isolation between the two cavities. The cavities 119 can be configured with either high or low voltage components as desired by the user. Bolts 127 secure the steel sleeve 109 to the outer shield 101. The bolts 127 extend through ceramic sleeves 129 between the outer shield 101 and the glass fiber sheet 103 and threaded sleeves 131 extend between the outer shield 101 and the lip 108 of the steel sleeve 109. EMT or rigid tubing 133 extend through openings 135 in the outer shield 101 and provide internal passageways for accepting conductors or communication cables for connection to the installed electrical components. Tabs 137 extend outward and upward from the perforated tubular sheet 111 will function to hold the floor assembly in a hole in the floor to hold the assembly therein until the assembly is secured to the floor with fasteners.

The outer shield 101 is preferably constructed of steel. The glass fiber sheet 103 preferably includes a temperature rating of at least 1800 degrees F. The perforated tubular sheet 111 is preferably constructed of aluminum. The duplex trim insert 115 is preferably constructed of steel. The intumescent sheet 105 preferably includes a thickness of at least 0.5-inch and the tubular intumescent layer 113 preferably includes a thickness of at least 0.25-inch.

The poke-through floor box assembly 100 is operated by inserting the assembly, which includes all portions below the top plate 121, through an appropriately sized hole in a floor. The installer feeds power or communications cables through the conduits 133 and then installs one or more low or high voltage components in the cavities 119, which can be two high voltage components, two low voltage components, or a low and high voltage component in the separate cavities. Wiring leads are connected to the components. Lastly, the top plate is secured to the assembly 100.

If the poke-through floor box assembly 100 is exposed to fire or high temperatures the intumescent sheet 105 will expand to fill the passageways in the EMT to prevent fire and heat from entering the cavities and electrical components and intumescent layer 113 will expand through the perforations in perforated tubular sheet 111 to seal any open space between the assembly 100 and the surrounding floor to prevent fire and heat from rising through the floor.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A poke-through floor box assembly, comprising:
a can including sidewalls having an inner surface and a bottom wall defining a chamber;
an electrical box for insertion in said chamber of said can, said electrical box including sidewalls;
a transition body for securing the electrical box to the can;
said transition body comprises a ring, a baseplate, and a support extending between said ring and said baseplate; and
said transition body comprises a tab extending from said support, said tab to engage a groove in said electrical box.

2. The poke-through floor box assembly of claim 1, comprising one or more fittings extending from said bottom wall, said fittings including bores open to said chamber of said can.

3. The poke-through floor box assembly of claim 1, comprising:
a post on said electrical box;
an alignment means for aligning said transition body with said can;
said alignment means including a leg on said transition body and a groove in said post of said electrical box.

4. The poke-through floor box assembly of claim 2, comprising a layer of intumescent material within said can.

5. A poke-through floor box assembly, comprising:
a can including sidewalls having an inner surface and a bottom wall defining a chamber;
an electrical box for insertion in said chamber of said can, said electrical box including sidewalls;
a transition body for securing the electrical box to the can;
a box alignment means for aligning said electrical box with said can; and said box alignment means including a tab on said electrical box and a recess in said bottom wall of said can.

6. A poke-through floor box assembly, comprising:
a can including sidewalls having an inner surface and a bottom wall defining a chamber;
an electrical box for insertion in said chamber of said can, said electrical box including sidewalls;
a transition body for securing the electrical box to the can;
wings extending from said sidewalls of said electrical box; and
a low voltage cavity between said wings of said electrical box and said inner surface of said can.

7. A poke-through floor box assembly, comprising:
a can including sidewalls having an inner surface and a bottom wall defining a chamber;
an electrical box for insertion in said chamber of said can, said electrical box including sidewalls;
a transition body for securing the electrical box to the can;
said transition body comprises a ring, a baseplate, and a support extending between said ring and said baseplate; and
one or more keystone holders on said transition body.

* * * * *